United States Patent [19]

Edwards

[11] Patent Number: 4,702,119
[45] Date of Patent: Oct. 27, 1987

[54] SHIFT MECHANISM EMPLOYING GEARS WITH BUILT-IN RAMPS

[75] Inventor: Douglas F. Edwards, Mt. Vernon, Ohio

[73] Assignee: The J. B. Foote Foundry Co., Fredericktown, Ohio

[21] Appl. No.: 23,275

[22] Filed: Mar. 9, 1987

Related U.S. Application Data

[63] Continuation of Ser. No. 804,483, Dec. 4, 1985, abandoned.

[51] Int. Cl.$^4$ ............................................. F16H 3/08
[52] U.S. Cl. ...................................... 74/371; 74/372; 74/701
[58] Field of Search ................. 74/369, 370, 371, 372, 74/375, 701

[56] References Cited

U.S. PATENT DOCUMENTS

| Re. 32,125 | 4/1986 | von Kaler et al. | 74/371 |
| 735,012 | 7/1903 | Barnes | 74/371 |
| 4,103,566 | 8/1978 | von Kaler et al. | 74/701 |
| 4,480,501 | 11/1984 | von Kaler | 74/701 |

FOREIGN PATENT DOCUMENTS

| 423694 | 4/1911 | France | 74/371 |
| 340194 | 12/1930 | United Kingdom | 74/372 |
| 2148419 | 5/1985 | United Kingdom | 74/371 |

Primary Examiner—Leslie Braun
Assistant Examiner—Dwight G. Diehl
Attorney, Agent, or Firm—Allen D. Gutchess, Jr.

[57] ABSTRACT

Shifting mechanism for shifting gears in a gear box. The gear box has a housing, a gear shaft in the housing, a plurality of gears on the shaft, a shift key movable along the shaft for individually connecting the gears to the shaft, a shift collar positioned around the shaft and engaged with the shift key, and a shift fork for moving the collar along the shaft. The shift key moves along a longitudinal groove in the shaft and has a lug with an extended position and a retracted position. The gears have bores through which the gear shaft extends so that the gears are rotatably supported on the shaft. At least one of the gears has a plurality of uniformly spaced recesses circumferentially located around the bore to receive the lug of the shift key so that the gear rotates with the shaft. The recesses have ramps extending regularly in common directions from the bottoms of the recesses toward a common face of the gear. The ramps force the shift key lug toward the retracted position when the key moves from one gear to another to prevent two gears from being engaged at the same time. A neutral collar is rotatably supported on the gear shaft and receives the shift key lug when the gear box is in a neutral position. The neutral collar has two oppositely-facing ramps to force the lug toward the retracted position when the shift key is moved in either direction from neutral.

4 Claims, 5 Drawing Figures

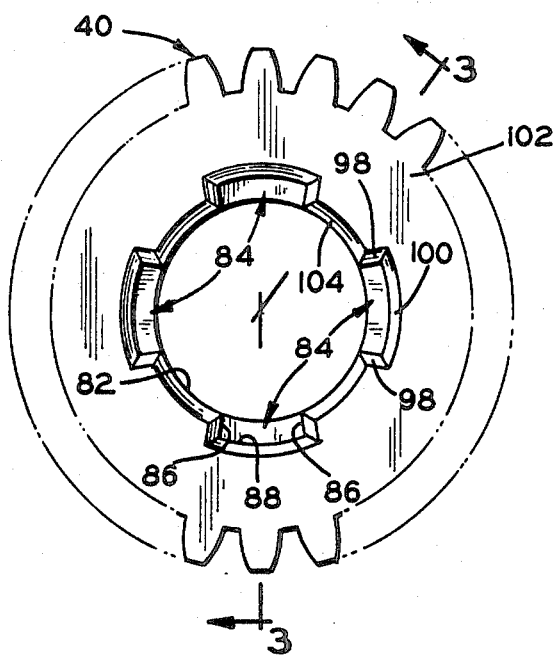
FIG. 2
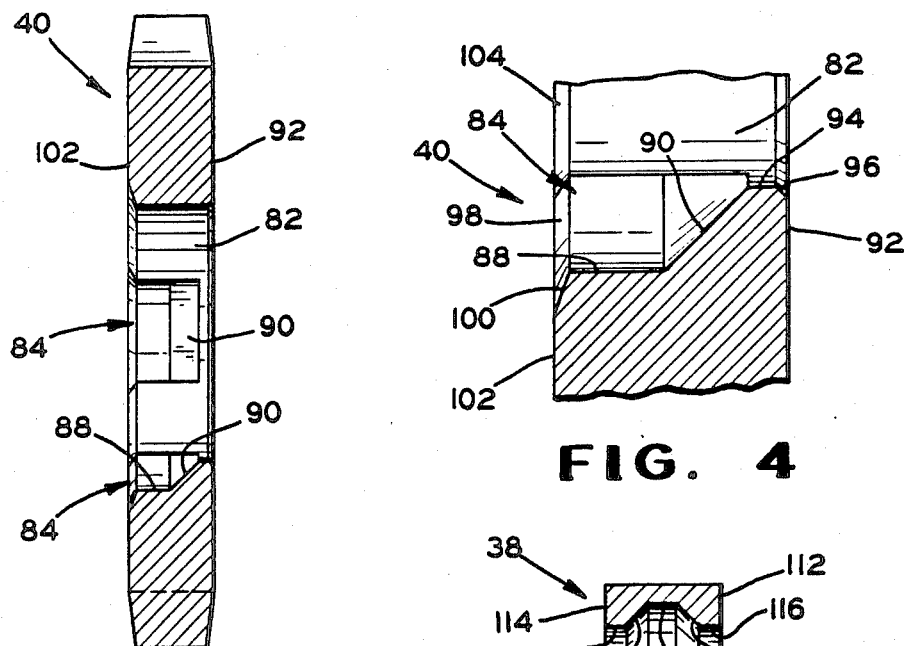
FIG. 3
FIG. 4
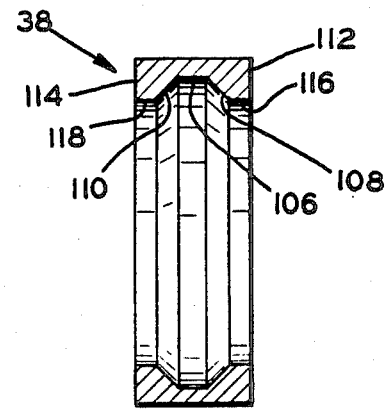
FIG. 5

SHIFT MECHANISM EMPLOYING GEARS WITH BUILT-IN RAMPS

This is a continuation of application Ser. No. 804,483, filed Dec. 4, 1985, now abandoned.

This invention relates to shift mechanism for shifting gears in a gear box or the like.

Gear boxes with which the new shift mechanism is employed are commonly in the nature of transmissions or transaxles, such as those used with small vehicles and other small powered utility devices. These include riding lawnmowers, garden tractors, golf carts, snow blowers, garden tillers, snowmobiles, and the like. The gear box has a housing, a gear shaft rotatably mounted in the housing, a plurality of gears rotatably mounted on the shaft, and a connecting member or shift key movable along the shaft for individually connecting the gears to the shaft for rotation together. The shift key is located in a longitudinal groove in the shaft and has a lug extending upwardly to engage recesses in the hubs of individual gears to mechanically connect them to the shaft. The shift key has a projection at an end opposite the lug, which projection is engaged by a shift collar positioned around the shaft to move the shift key when the collar is moved along the shaft by a suitable shifter fork.

When the shift key is moved along the shaft to move the lug out of the recess of one of the gears and into the recess of an adjacent or contiguous gear, the lug must be depressed into the longitudinal groove of the shaft so as to be momentarily out of engagement with the recesses of both of the gears, to prevent the possibility of two gears being mechanically connected to the shaft at the same time. For this purpose, washers have been located around the shaft between adjacent gears so that their inner peripheries depress the lug when the key is moved from one gear to another. This is shown in U.S. Pat. No. 3,812,735 issued May 28, 1974, for example. In another design, the recesses in the gear have smooth outer edges at the faces of the gears so that the key will not engage the gears when passing under the outer edges from one gear to another. Such is shown in U.S. Pat. No. 735,012, issued July 28, 1903.

In accordance with the invention, a plurality of gears are mounted on a shaft for individual rotation therewith. The gears have hubs with bores through which the gear shaft extends to rotatably support the gears thereon. The gears have a plurality of uniformly spaced recesses or notches circumferentially located around the bores to receive the lug of a shift key so that the engaged gear rotates with the shaft. The recesses of each gear have ramps extending angularly in common directions from the bottoms of the recesses toward a common face of the gear. The ramps force the shift key lug toward the retracted position when the key moves from one gear to another to prevent two gears from being engaged at the same time. This design eliminates the need for the separate washers which eliminates the cost of the washers as well as the cost of assembling them on the shaft between the gears. A substantial savings in manufacturing costs has been found to be achieved with the new design.

In a preferred form, the gears in accordance with the invention are made by powered metal technology so that the cost of forming the ramps in the gear hubs is relatively minor or insignificant. The ramps and the bores of each of the gears also have a common, annular beveled surface at one gear face to provide recesses or traps for burrs which could otherwise possibly cause binding in the operation of the gear box. The recesses and bores of each of the gears also have chamfers where they would otherwise meet the other face of the gear to again provide recesses or traps for burrs to prevent possible interference and binding. The inner edges of the ramps and the adjacent portions of the bore also form a flat, annular edge at the one gear face to smooth the shift operation.

It is, therefore, a principal object of the invention to provide a more simple shift mechanism for a gear box in the nature of a transmission, transaxle, or the like.

A further object of the invention is to provide a shift mechanism for a gear box which achieves a smoother and yet more positive feel for the operator when shifting gears.

Another object of the invention is to provide a shift mechanism in which each of the gears has a hub with recesses having ramps extending from the bottoms of the recesses to a common face of the gear.

Still another object of the invention is to provide a gear box with gears, each of which has recesses in a bore thereof with each recess having a ramp extending toward a common surface of the gear, with the ramps terminating at the bores in flat, annular edges and with the bores, recesses, and ramps having beveled surfaces at the gear faces.

Various other objects and advantages of the invention will be apparent from the following detailed description of a preferred embodiment thereof, reference being made to the accompanying drawings, in which:

FIG. 2 is a face view of a gear in accordance with the invention employed in the transaxle;

FIG. 3 is a view in transverse cross section taken along the lines 3—3 of FIG. 2;

FIG. 4 is a greatly enlarged, fragmentary view of a portion of the gear shown in FIG. 3; and FIG. 5 is a view in vertical cross section of a neutral collar of the transaxle of FIG. 1.

Figure 1:
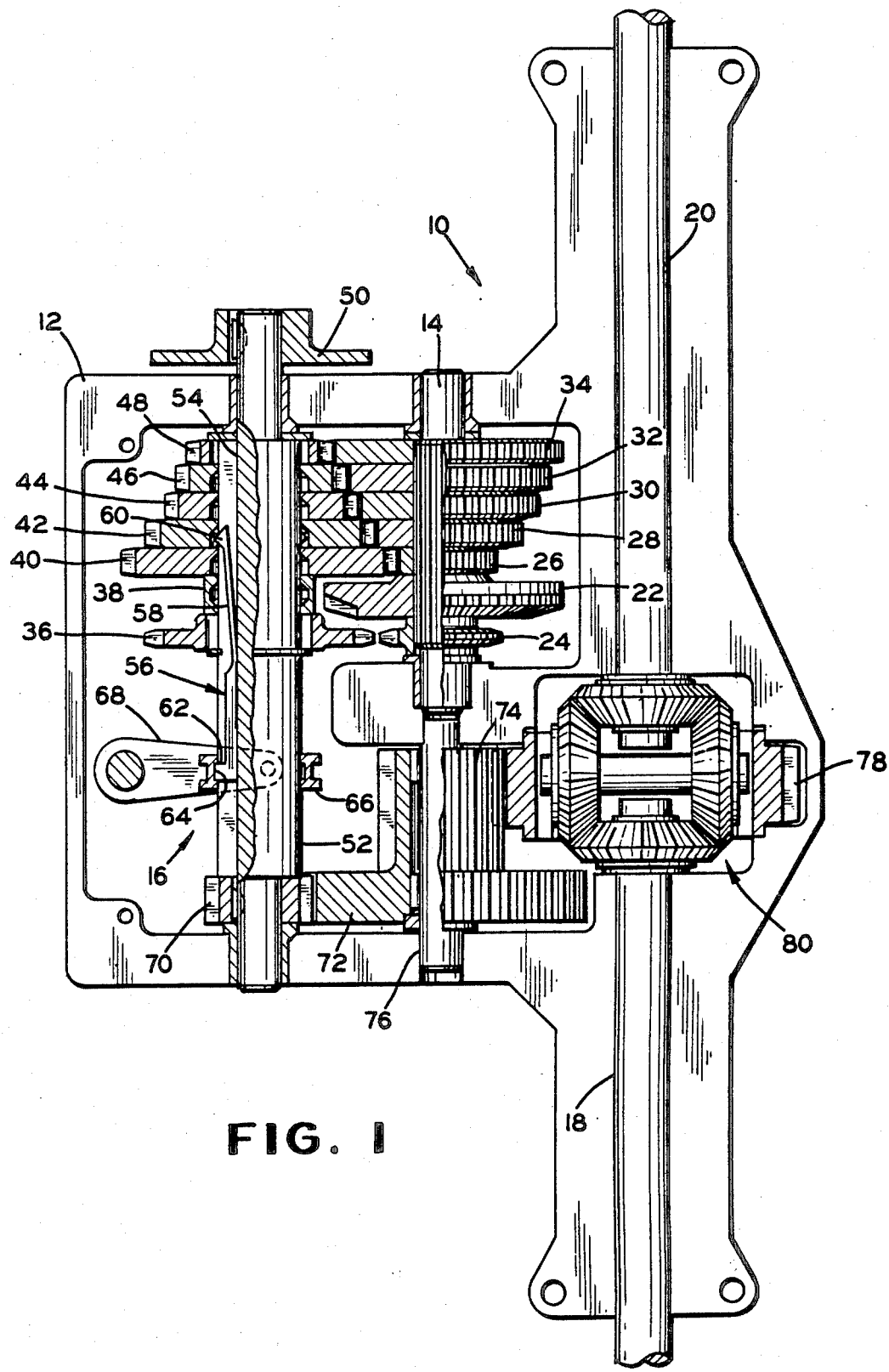
FIG. 1 is a somewhat schematic top view of a transaxle embodying the invention, with an upper housing part removed and with parts in cross section.

Referring to FIG. 1, a transaxle with which the shift mechanism according to the invention can be employed is indicated at 10. The transaxle includes a housing 12 containing a middle, input shaft 14, an intermediate gear shaft 16, and rear, output shafts or axles 18 and 20. a driven bevel gear 22 is affixed to the input shaft 14 and can be driven by a drive bevel gear (not shown) mounted on a vertical drive shaft and having an outer drive pulley above the housing. The pulley can be driven through a belt by an engine mounted forwardly on a vehicle, as is well known in the art.

A reverse sprocket or toothed member 24 is affixed to the input shaft 14 on one side of the driven bevel gear 22 and five forward speed gears or toothed members 26, 28, 30, 32 and 34 are affixed to the shaft 14 on the other side of the driven bevel gear 22.

A driven reverse sprocket or toothed member 36 is rotatably mounted on the gear shaft 16 on one side of a neutral spacing ring or collar 38 and is connected to the sprocket 24 by a suitable chain (not shown). Five driven forward speed gears or toothed members 40, 42, 44, 46 and 48 are rotatably mounted on the shaft 16 on the other side of the neutral collar 38. A brake disc 50 is affixed to the shaft 16 outside of the housing 12.

An enlarged portion 52 of the gear shaft 16 has two longitudinally extending grooves 54 therein, being diametrically opposed. A connecting member or shift key 56 is located in each of the grooves 54 for longitudinal movement therein. The key 56 includes a resilient shank 58 having a lug 60 at one end which is generally of equilateral triangular shape. The key has a projection 62 at the other end which is received in an annular groove 64 of a shift collar 66. The collar 66 is moved along the shaft 16 by a shifter fork 68, as is known in the art.

When one of the toothed members is engaged with the gear shaft 16 through the draw key 56, the shaft rotates accordingly and rotates a drive pinion gear 70 which is keyed to a small end of the shaft 16. The pinion gear drives a large spur gear 72 which is structurally integral with a smaller spur gear 74. These gears are rotatably mounted on a stationary axle 76. The gear 74 drives a ring gear 78 of a differential 80 which can be of the type shown in U.S. Pat. No. 4,232,569, issued on Nov. 11, 1980. The output shafts or axles 18 and 20 are then driven through the differential, being connected to driven wheels of a vehicle on which the transaxle is mounted, for example.

The forward speed gear 40 is shown in FIGS. 2-4. It is of the same design as the forward speed gears 42, 44, and 46, except for size and number of teeth. The hub of the gear 40 has a bore 82 and four recesses 84 which are of the same size and shape and are uniformly positioned around the bore 82 at ninety degree angles from one another. Each of the recesses 84 has a bottom 86 and side walls 88. Each of the recesses 84 also has a ramp 90 extending angularly upwardly toward a common face 92 of the gear at an angle of thirty to sixty degrees with respect to the recess bottom 86 and preferably at an angle of forty to fifty degrees. The width of the base of the ramp 90 and the recesses 84 at the bottom 86 is from one-third to two-thirds the thickness of the gear and preferably from forty-five to fifty-five percent of the thickness.

The ramps 90 terminate in flat, arcuate edges 94 which form extensions with the bores 82 and the flat edges 94 along with the bores 82 form an annular beveled surface 96 at the gear face 92. The beveled surface 96 forms a recess or trap for burrs which might otherwise cause binding at the shaft or when the gear face 92 is contiguous with a gear face of an adjacent gear. The flat, arcuate edge 94 of the ramp 90 aids in a smoother transition of the lug 60 of the draw key 56 when moving from one gear to another. The flat edge 94 also aids in assuring that the lug 60 of the key 56 cannot engage the recesses 84 of two adjacent gears at once. The flat edge 94 has a width from ten to twenty-five percent of the thickness of the gear and preferably from fifteen to twenty percent of the thickness.

The side walls 86 and the bottom 88 of each of the recesses 84 also form beveled surfaces 98 and 100 at an opposite gear face 102 of the gear 40. These surfaces connect with arcuate beveled surfaces 104 formed where the bores 42 would otherwise meet the gear face 102. The beveled surfaces 98, 100, and 104 also form burr traps or recesses to prevent possible binding.

The sloping ramps enable the shifting of the transaxle from one gear to another to proceed more smoothly than as heretofore been the case when washers have been employed between the gears. At the same time the shift mechanism gives the operator a more positive or definite feeling that a particular forward speed gear is engaged when that condition is achieved.

There need be only one of the ramps 90 at each pair of contiguous gear faces. Consequently, the end forward speed gear 48 can have conventional straight through recesses from face to face without any ramps, as shown in FIG. 1.

the neutral collar 38 is shown more fully in FIG. 5. The collar 38 has an annular recess 106 with two annular ramps 108 and 110 extending upwardly therefrom in opposite directions toward collar faces 112 and 114, terminating in flat annular edges 116 and 118. These provide a bore for supporting a collar on the shaft 16 and also provide a smooth transition for the shift key 56 from one gear to another or to the collar. By providing both of the ramps 108 and 110 for the neutral collar 38, no ramps need be provided for the reverse sprocket 36 so that it can also have straight through recesses as does the forward speed gear 48.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. In a gear box having a gear shaft, a plurality of forward speed first gears, said first gears having two faces, said gears having bores forming circumferentially-spaced, inwardly-extending, arcuate surfaces rotatably receiving said shaft, a forward speed end gear rotatably mounted on said shaft adjacent the forward speed first gears, said forward speed end gear having two faces and a bore extending therebetween, a connecting member having a lug of generally triangular shape movable along said shaft for individually connecting said gears to said shaft for causing said gears to rotate individually with said shaft, said first gears having circumferentially-spaced recesses around said shaft to receive said lug, a neutral collar rotatably mounted on said shaft adjacent an end one of said plurality of first gears, said collar having two faces, said end gear being adjacent the other end one of said plurality of first gears, and a sprocket on said shaft adjacent said neutral collar on the side opposite said plurality of said first gears, said sprocket having two faces and a bore through which said gear shaft extends, the improvement comprising said forward speed end gear bore having a plurality of circumferentially-spaced recesses extending completely between the faces thereof to receive said lug, said sprocket bore having a plurality of circumferentially-spaced recesses extending completely between the faces thereof to receive said lug, said first gears having ramps in the recesses thereof, all of said ramps facing in only one common direction toward said neutral collar, the ramps of each of said first gears extending angularly substantially from the bottoms of the recesses toward only one common faces of the first gears away from said neutral collar, said ramps terminating in flat, arcuate edges having a width from ten to twenty-five percent of the thickness of the associated first gear, said flat, arcuate edges and said inwardly-extending arcuate surfaces forming continuous annular surfaces around the entire circumference of said gear shaft, and said flat, arcuate edges and said inwardly-extending, arcuate surfaces having common annular beveled surfaces at the common gear faces.

2. In a gear box according to claim 1, the improvement further comprising said recesses having beveled surfaces where they would otherwise meet gear faces opposite the common gear faces.

3. In a gear box having a gear shaft, a plurality of gears, said gears having bores forming circumferentially-spaced, inwardly-extending, arcuate surfaces rotatably receiving said shaft, a connecting member having a lug of generally triangular shape movable along said shaft for individually connecting said gears to said shaft for causing said gears to rotate individually with said shaft, said gears having circumferentially-spaced recesses around said shaft to receive said connecting member lug, the improvement comprising at least at least some of said gears having ramps in said recesses, all of said ramps facing in only one common direction and extending angularly from the bottom of said recesses only toward common faces of said gears which face in a common direction, said ramps terminating in flat, arcuate edges having a width from ten to twenty-five percent of the thickness of the associated gear, said flat, arcuate edges and said inwardly-extending, arcuate surfaces forming continuous annular surfaces around the entire circumference of said gear shaft, said flat, arcuate edges and said inwardly-extending, arcuate surfaces having common annular beveled surfaces at the common gear faces, and said recesses having beveled surfaces where they would otherwise meet gear faces opposite the common gear faces.

4. The improvement according to claim 3 characterized by said flat edges having a width from fifteen to twenty percent of the thickness of the associated gear.

* * * * *